United States Patent
Tsuyama (10) Patent No.: US 11,775,157 B2
(45) Date of Patent: Oct. 3, 2023

(54) IMAGE PROCESSING APPARATUS, IMAGE PROCESSING SYSTEM, AND CONTROL METHOD FOR PROCESSING A SECOND IMAGE WITH ADJUSTING LEVEL OF A FIRST IMAGE

(71) Applicant: CANON KABUSHIKI KAISHA, Tokyo (JP)

(72) Inventor: Kazuya Tsuyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 430 days.

(21) Appl. No.: 17/166,938

(22) Filed: Feb. 3, 2021

(65) Prior Publication Data
US 2021/0258469 A1    Aug. 19, 2021

(30) Foreign Application Priority Data

Feb. 13, 2020 (JP) ................. 2020-022218

(51) Int. Cl.
| | |
|---|---|
| *G06F 3/04845* | (2022.01) |
| *G06T 5/50* | (2006.01) |
| *G06N 20/00* | (2019.01) |
| *G06T 11/60* | (2006.01) |
| *H04N 23/66* | (2023.01) |
| *H04N 23/80* | (2023.01) |

(52) U.S. Cl.
CPC ........ *G06F 3/04845* (2013.01); *G06N 20/00* (2019.01); *G06T 5/50* (2013.01); *G06T 11/60* (2013.01); *H04N 23/66* (2023.01); *H04N 23/80* (2023.01); *G06T 2207/20212* (2013.01); *H04N 2201/325* (2013.01)

(58) Field of Classification Search
CPC .... G06F 3/04845; G06N 20/00; H04N 23/66; H04N 23/80; H04N 2201/325; G06T 5/50; G06T 11/60; G06T 2207/20212
USPC ........................................ 382/254
See application file for complete search history.

(56) References Cited

U.S. PATENT DOCUMENTS

| | | | |
|---|---|---|---|
| 6,977,680 B1 | 12/2005 | Ichihara | |
| 10,887,511 B2* | 1/2021 | Urano | ............ H04N 23/62 |
| 2012/0191575 A1* | 7/2012 | Vilke | ............ G06Q 30/0641 |
| | | | 705/27.1 |
| 2013/0182133 A1 | 7/2013 | Tanabe | |
| 2020/0322530 A1* | 10/2020 | Choi | ............ G06T 5/50 |
| 2021/0243365 A1* | 8/2021 | Hata | ............ H04N 23/80 |

FOREIGN PATENT DOCUMENTS

| | | |
|---|---|---|
| JP | 2003259281 A | 9/2003 |
| JP | 2009044256 A | 2/2009 |

* cited by examiner

*Primary Examiner* — Gabriel I Garcia
(74) *Attorney, Agent, or Firm* — Canon U.S.A., Inc. IP Division

(57) ABSTRACT

An image processing apparatus transmits first image data to an external apparatus, receives from the external apparatus second image data generated by the external apparatus performing first image processing on the first image data, and processes the received second image data at a level corresponding to a level of the first image processing adjusted through a user interface.

18 Claims, 8 Drawing Sheets

IMAGE PROCESSING APPARATUS, IMAGE PROCESSING SYSTEM, AND CONTROL METHOD FOR PROCESSING A SECOND IMAGE WITH ADJUSTING LEVEL OF A FIRST IMAGE

BACKGROUND OF THE INVENTION

Field of the Invention

The present invention relates to a technique in which image data is transmitted to an external apparatus, and the external apparatus performs image processing on the image data.

Description of the Related Art

An imaging apparatus such as a digital camera includes various kinds of hardware to perform processing relating to imaging and reproduction of an image.

Functions and performance of the imaging apparatus are improved with appearance of a new model. To use these performance and functions, a user is required to obtain a new model of the imaging apparatus. However, buying a new imaging apparatus every time a new model appears gives large economic burden to the user. Therefore, there is a demand of improving performance of the imaging apparatus currently owned by the user.

On the other hand, in a smartphone and a tablet terminal device, installation of a new application can improve functions of the terminal device. Even when the new application is downloaded, however, performance of hardware inside the terminal device used to execute the application is not changed, and an improvable range of the performance is limited.

On the other hand, Japanese Patent Application Laid-open No. 2003-259281 discusses a technique of outputting image data obtained by capturing an image by an imaging apparatus to a server together with additional information about image processing and causing the server to perform the image processing. In other words, the imaging apparatus discussed in Japanese Patent Application Laid-open No. 2003-259281 can cause the server to perform image processing. Therefore, image data subjected to high quality image processing can be obtained, regardless of the performance of the imaging apparatus.

However, image data generated through image processing by a server is not necessarily coincident with intention of the user. For example, an image of an object and a background not intended by the user may be made clear, or atmosphere of the image may be changed with improvement of a correction level. Further, in image processing using machine learning, in a case of a special scene or object not included in a group of image data used in the machine learning, suitable image processing may not be performed. Therefore, the user is required to check a result of the image processing applied by the server, and to adjust an application amount (level) of the image processing by the server.

In Japanese Patent Application Laid-Open No. 2003-259281, to enable the user to check the result of the image processing performed by the server, the result of the image processing performed by the server is transmitted from the server to a terminal device used by the user. Therefore, in a case where the user uses the terminal device to adjust the application amount of the image processing performed by the server, the terminal device needs to transmit the adjustment application amount to the server, and the server performs the image processing based on the adjustment application amount and transmit the result of the image processing to the terminal device. The user needs to check the result of the image processing transmitted from the server by using the terminal device. When the result of the image processing is not coincident with a result intended by the user, the user needs to adjust the application amount of the image processing again by using the terminal device, and the terminal device needs to transmit the adjusted application amount to the server. In such a configuration, communication between the user terminal and the server is necessary every time the user adjusts the application amount of the image processing, which increases traffic and time necessary for the processing.

The present invention is directed to an image processing apparatus that can easily adjust an application amount of image processing by an external apparatus without increasing traffic.

SUMMARY OF THE INVENTION

According to an aspect of the present invention, an image processing apparatus includes a communication unit configured to transmit first image data to an external apparatus and to receive, from the external apparatus, second image data generated by the external apparatus performing first image processing on the first image data, an image processing unit configured to process the second image data, a control unit configured to set a level of the processing by the image processing unit, and a user interface configured to adjust a level of the first image processing by the external apparatus, wherein the control unit causes the image processing unit, when the level of the first image processing is adjusted through the user interface, to process the second image data at a level corresponding to the adjusted level of the first image processing.

According to an aspect of the present invention, an image processing system, includes an external apparatus, and an image processing apparatus, wherein the external apparatus includes a first communication unit configured to communicate with the image processing apparatus, and a first image processing unit configured to perform first image processing on image data, wherein the image processing apparatus includes a second communication unit configured to communicate with the external apparatus, a second image processing unit configured to process image data, a control unit configured to set a level of the processing by the second image processing unit, and a user interface configured to adjust a level of the first image processing by the external apparatus, wherein the second communication unit of the image processing apparatus transmits first image data to the external apparatus, wherein the first image processing unit of the external apparatus generates the second image data by performing the first image processing on the first image data received through the first communication unit, wherein the first communication unit of the external apparatus transmits the second image data to the image processing apparatus, and wherein the control unit of the image processing apparatus causes the second image processing unit, when the level of the first image processing is adjusted through the user interface, to process the second image data at a level corresponding to the adjusted level of the first image processing, and displays on a display unit an image based on the image data generated by processing the second image data.

Further features of the present invention will become apparent from the following description of exemplary embodiments with reference to the attached drawings.

DESCRIPTION OF THE EMBODIMENTS

In a description of a following exemplary embodiment, an imaging apparatus is used as an example of an image processing apparatus that causes an external apparatus to perform correction processing. The image processing apparatus, however, is not limited to the imaging apparatus, and the exemplary embodiment of the present invention is applicable to an optional apparatus that can cause an external apparatus to perform image processing and can combine image data before and after the image processing. The exemplary embodiment of the present invention is applicable to, for example, a mobile phone, a smart phone, a tablet terminal, and a personal computer (PC) terminal each having a camera. Note that the apparatus does not necessarily include an imaging function, and the exemplary embodiment of the present invention is also applicable to an apparatus that receives image data from an imaging apparatus.

Figure 1:
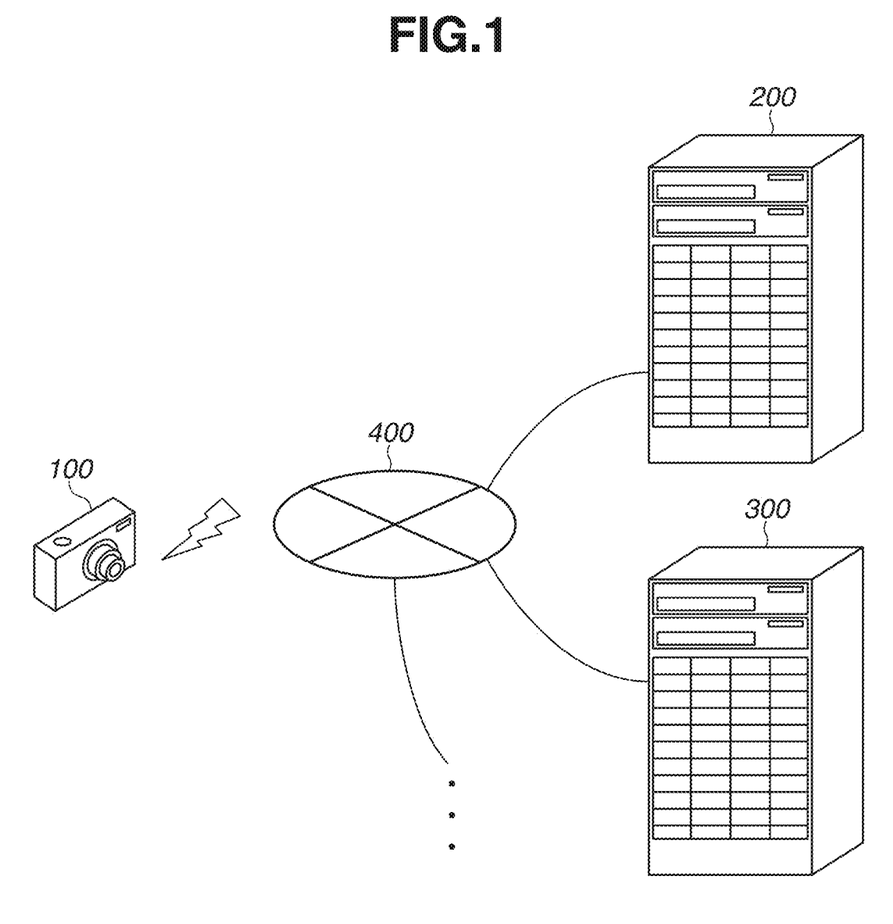
FIG. 1 is a diagram illustrating a configuration of an image processing system that includes an imaging apparatus as an image processing apparatus and a first server and a second server as external apparatuses according to an exemplary embodiment of the present invention.

FIG. 1 is a diagram illustrating a configuration of an image processing system that includes an image processing apparatus and an external apparatus communicable with each other, according to an exemplary embodiment of the present invention.

The image processing system according to the present exemplary embodiment includes an imaging apparatus 100 as an example of the image processing apparatus, and a first server 200 and a second server 300 as external apparatuses. The imaging apparatus 100 according to the present exemplary embodiment is a digital camera. The imaging apparatus 100, the first server 200, and the second server 300 are connected to one another through a network 400. In the present exemplary embodiment, an example in which the first server 200 is used as an external apparatus providing a so-called cloud service to the imaging apparatus 100 is described. The number of external apparatuses is not limited thereto. In addition, in the present exemplary embodiment, the imaging apparatus 100 is connected to the external apparatuses through a wireless network. However, the imaging apparatus 100 may be connected to the external apparatuses through wired connection.

Figure 2:
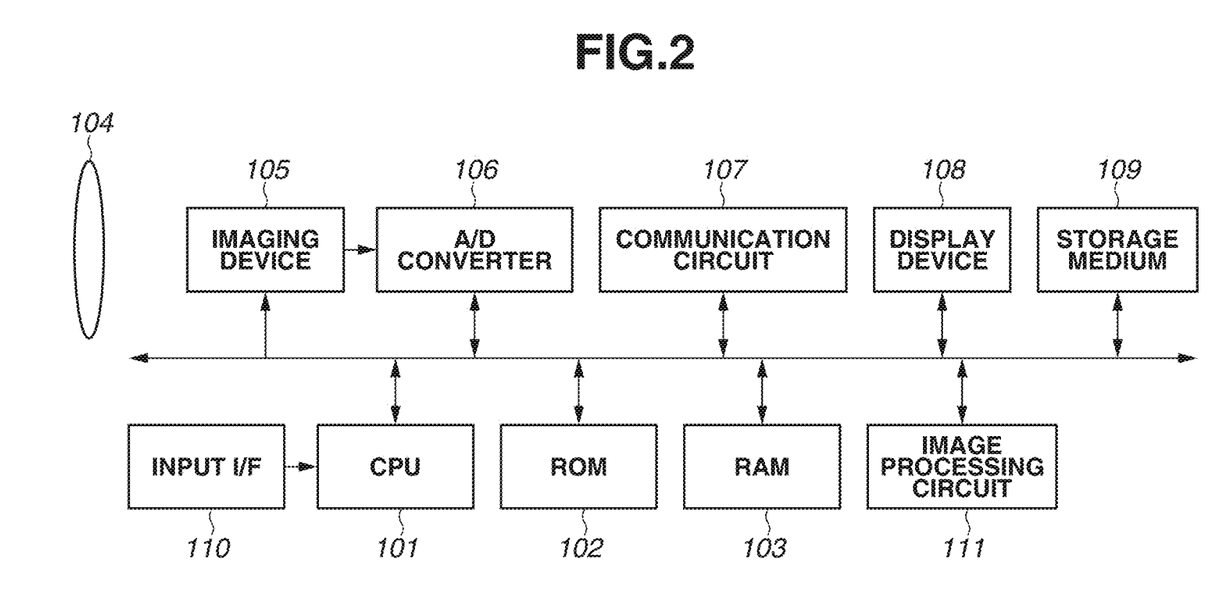
FIG. 2 is a block diagram illustrating a functional configuration of the imaging apparatus according to the exemplary embodiment of the present invention.

FIG. 2 is a block diagram illustrating a functional configuration of the imaging apparatus 100 according to the present exemplary embodiment.

A central processing unit (CPU) 101 controls operation of each of blocks included in the imaging apparatus 100. More specifically, the CPU 101 reads out an operation program stored in a read only memory (ROM) 102, loads the operation program into a random access memory (RAM) 103, executes the loaded operation program, thereby controlling the operation of each of the blocks.

The ROM 102 is, for example, a rewritable nonvolatile memory, and stores operation programs for processing such as imaging processing and reproduction processing performed by the imaging apparatus 100. The ROM 102 further stores parameters and user setting information necessary for operation of each of the blocks included in the imaging apparatus 100.

The RAM 103 is a volatile memory, and is used as a loading area of the operation program for each of the blocks included in the imaging apparatus 100, and also as a storage area storing intermediate data output in the operation of each of the blocks.

An imaging optical system 104 is a lens device used to form an optical image on an imaging device 105. In FIG. 2, the imaging optical system 104 is simply illustrated. The imaging optical system 104 may be a zoom lens device, a single focus lens device, or a lens device including an anti-vibration mechanism.

The imaging device 105 includes, for example, a charge-coupled device (CCD) sensor or a complementary metal-oxide semiconductor (CMOS) sensor. The imaging device 105 photoelectrically converts the optical image formed by the imaging optical system 104 on a light receiving surface into an analog image signal, and outputs the obtained analog image signal to an analog-to-digital (A/D) converter 106.

The A/D converter 106 applies A/D conversion processing to the input analog image signal to obtain a digital image signal (image data), and outputs and stores the obtained digital image signal in the RAM 103.

A communication circuit 107 is a communication interface of the imaging apparatus 100 with the first server 200 and the second server 300 as the external apparatuses. The communication circuit 107 transmits a command that is compliant with a certain protocol to instruct processing to be performed by the external apparatuses, and transmits image data to be processed by the external apparatuses thereto and receives image data generated through the processing by the external apparatuses therefrom.

A display device 108 is a monitor such as a small liquid crystal display (LCD) and an organic electroluminescence (EL) display, included in the imaging apparatus 100. The display device 108 displays an image by using image data obtained through predetermined image processing after being output from the A/D converter 106, image data stored in a storage medium 109, or the like, based on an instruction by the CPU 101.

The storage medium 109 is a storage device such as a built-in memory included in the imaging apparatus 100 and a memory card. The storage device may be incorporated in or attachable to and detachable from the imaging apparatus 100. Image data captured by the imaging apparatus 100 is basically subjected to predetermined processing, and the processed image data is then stored in the storage medium 109.

An input interface (I/F) 110 is a user interface of the imaging apparatus 100, such as a shutter button, a mode dial, and a menu button. A part of the input i/F 110 may also be included in the touch panel display device 108. When detecting operation by the user, the input I/F 110 generates a control signal corresponding to the operation, and transmits the control signal to the CPU 101.

An image processing circuit 111 performs predetermined image processing on the image data output from the A/D converter 106 or the image data read out from the storage medium 109. Examples of the predetermined image processing include sensor characteristics correction processing, optical aberration correction processing, noise reduction processing, resizing processing, and compression processing.

Figure 3:
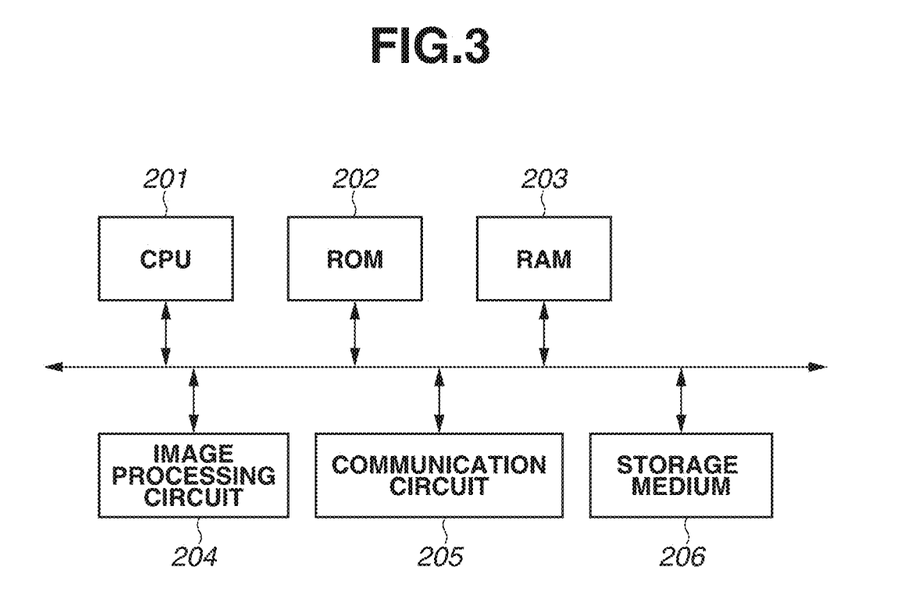
FIG. 3 is a block diagram illustrating a functional configuration of the first server according to the exemplary embodiment of the present invention.

FIG. 3 is a block diagram illustrating a functional configuration of the first server 200 according to the present exemplary embodiment. In the following description, it is assumed that the first server 200 and the second server 300 each have the same configuration illustrated in FIG. 3, and the configuration of the first server is described below.

A CPU 201 controls operation of each of blocks included in the first server 200. More specifically, the CPU 201 reads out an operation program for each piece of predetermined processing stored in a ROM 202 or a storage medium 206, loads the operation program to a RAM 203, executes the loaded operation program, thereby controlling the operation of each of the blocks. In the following description, the operation programs are stored in the ROM 202.

The ROM 202 is, for example, a rewritable nonvolatile memory. The ROM 202 stores operation parameters necessary for the operation of each of the blocks, in addition to the operation programs of the predetermined processing.

The RAM 203 is a volatile memory. The RAM 203 is used as a loading area of the operation programs, and stores intermediate data output in the operation of each of the blocks included in the first server 200.

An image processing circuit 204 includes, for example, a graphics processing unit (GPU), and can perform high-load high-performance image processing on image data acquired through a communication circuit 205 and image data stored in the storage medium 206, as compared with the image processing performable by the imaging apparatus 100. Examples of the image processing performed by the image processing circuit 204 include noise reduction processing, high resolution processing, and optical aberration correction processing each using deep learning in machine learning. Further, the image processing circuit 204 can perform the predetermined image processing performed by the image processing circuit 111 of the imaging apparatus 100.

The communication circuit 205 is a communication interface of the first server 200 with the imaging apparatus 100 and the second server 300. The communication circuit 205 receives the image data, a command that is compliant with a predetermined protocol to instruct processing to be performed, or transmits image data processed based on the received instruction.

The storage medium 206 is a storage device such as a hard disk drive (HDD) and a solid state drive (SSD), detachably connected to the first server 200. The image data received from the imaging apparatus 100 is stored in the storage medium 206 in response to an instruction by the CPU 201.

The image processing using the imaging apparatus 100 as the image processing apparatus and the first server 200 (hereinafter, referred to as server 200) as the external apparatus according to the present exemplary embodiment is described with reference to flowcharts of FIG. 4 to FIG. 6.

In step S401, the CPU 101 acquires image data. When the imaging apparatus 100 operates in an imaging mode, the image data may be generated by using the imaging device 105 and the A/D converter 106. When the imaging apparatus 100 operates in a reproduction mode, the image data may be read out from the storage medium 109. In a case where a tablet terminal or a PC terminal is used in place of the imaging apparatus 100, the image data may be received from another terminal apparatus.

In step S402, the CPU 101 determines whether the imaging apparatus 100 has been set to use image processing by the server 200 as the external apparatus. In a case where the imaging apparatus 100 has been set to use the image processing by the server 200 (YES in step S402), the processing proceeds to step S403. In a case where the imaging apparatus 100 has not been set to use the image processing by the server 200 (NO in step S402), the processing proceeds to step S416. For example, when the user switches the setting to a setting to use the image processing by the server 200 through a menu screen of the imaging apparatus 100, the CPU 101 determines that the imaging apparatus 100 has been set to use the image processing by the server 200. Alternatively, in a case where the image processing by the server 200 targets only a user previously registered, the CPU 101 determines that the imaging apparatus 100 has been set to use the image processing by the server 200 when the user logs in a predetermined site managed by the server 200 through the imaging apparatus 100.

In step S403, the CPU 101 transmits the acquired image data to the server 200 through the communication circuit 107.

In step S404, the CPU 101 determines whether image processing inside the imaging apparatus 100 is necessary for the image data. In a case where the image processing is necessary (YES in step S404), the processing proceeds to step S405. In step S405, the CPU 101 causes the image processing circuit 111 to perform the image processing on the image data. In a case where it is determined in step S404 that the image processing is unnecessary (NO in step S404), the processing skips step S405 and proceeds to step S406. The image processing is, for example, the sensor characteristics correction processing, and the optical aberration correction processing. In a case where the image data acquired in step S401 is RAW data, the image processing is performed. In a case where the image data acquired in step S401 is image data already subjected to development processing, step S404 can be omitted.

In step S406, the CPU 101 waits until the CPU 101 receives high-quality image data subjected to the image processing by the server 200, from the server 200 through the communication circuit 107 (NO in step S406). When the CPU 101 receives the high-quality image data (YES in step S406), the processing proceeds to step S407. The high-quality image data is generated by the server 200 applying high-performance image processing not performable by the imaging apparatus 100, to the image data transmitted to the server 200 in step S403, in addition to image processing similar to the image processing performed in step S403. An application amount (level) of the high-performance image processing applied by the server 200 is adjustable by the user instruction through the input IF 110. The high-quality image data received in step S406 is image data subjected to the image processing with the maximum value of the application amount. After the processing in step S406, the processing proceeds to step S407 in FIG. 5.

In step S407, the CPU 101 causes the image processing circuit 111 to process the high-quality image data received in step S406. More specifically, the CPU 101 causes the image processing circuit 111 to combine the image data acquired in step S401 or the image data subjected to the image processing in step S405 with the high-quality image data received in step S406 at a ratio corresponding to a parameter indicating the application amount of the high-performance image processing. For example, a signal level at coordinates i and j of the image data acquired by the imaging apparatus 100 in step S401 or the image data subjected to the image processing in step S405 is denoted by Ip(i, j), and a signal level at coordinates i and j of the high-quality image data received in step S406 is denoted by Iq(i, j). When the application amount is set to α (α is 0 or more and 1 or less), a signal level Io(i, j) at the coordinates i and j of the combined image data can be represented by an expression (1), $$Io(i,j)=(1-\alpha)\times Ip(i,j)+\alpha\times Iq(i,j). \quad (1)$$

For example, when the application amount of the high-performance image processing by the server 200 is set to 70%, α is set to 0.7. In the present exemplary embodiment, an initial value of α is set to 1.0 corresponding to the maximum value (100%) of the application amount.

In this example, the imaging apparatus 100 transmits the RAW data to the server 200 in step S403, and performs the sensor characteristics correction processing on the RAW data in step S405. In a case where the server 200 receives the RAW data and performs the noise reduction processing using the deep learning after performing the sensor characteristics correction processing the same as the sensor characteristics correction processing by the imaging apparatus 100, the application amount indicates the application level of the noise reduction processing using the deep learning. In other words, the application amount indicates a level, to be applied to the image data, of the image processing performed only by the server 200 different from the image processing applied by the imaging apparatus 100, among the imaging processing applied by the server 200.

Thus, the server 200 can change the image processing applied by the server 200, based on the application amount of which image processing being made to be adjustable in the imaging apparatus 100. For example, in a case where the application amount of the noise reduction processing performed by the server 200 is made to be adjustable, the server 200 may perform the other image processing in the same manner as the imaging apparatus 100. Alternatively, in a case where the application amounts of the optical aberration correction processing and the noise reduction processing performed by the server 200 are desired to be made adjustable collectively, the server 200 may perform the other image processing in the same manner as the imaging apparatus 100. Alternatively, after the imaging apparatus 100 performs the image processing other than the image processing, the application amount of which is to be adjusted, the imaging apparatus 100 transmits the image data to the server 200. In this way, the server 200 performs only the image processing, the application amount of which is to be adjusted.

In the present exemplary embodiment, the processing in which the image data received from the server 200 and the image data inside the imaging apparatus 100 are combined in order to process the image data received from the server 200 has been described above. However, the processing is not limited thereto. The processing such as filter processing may be performed on the image data received from the server 200 as long as image data similar to the image data obtained by the combination processing is obtainable. For example, in a case where the image processing performed by the server 200 is the high resolution processing, the filter processing to reduce the resolution may be applied to the image data received from the server 200 based on the application amount. In a case where the image processing performed by the server 200 is the optical aberration correction processing, the filter processing to impart optical aberration to the image data received from the server 200 may be applied based on the application amount.

In step S408, the CPU 101 displays an image on the display device 108 by using the image data generated in step S407. The image displayed in step S408, however, is not completely coincident with the image based on the image data subjected to the noise reduction processing performed based on the set application amount. Since the image processing performed by the image processing circuit 204 of the server 200 is the high-load high-performance image processing, changing the application amount of the image processing changes various parameters to be used for the image processing in a complicated manner. Accordingly, even when the image data of the imaging apparatus 100 and the high-quality image data received from the server 200 are simply combined based on the application amount, the combined image is not equivalent to the image data subjected to the image processing with the application amount by the server 200. However, combining the image data makes it possible to generate image data similar to the image data subjected to the image processing with the application amount by the server 200. In this way, presenting the image based on the image data generated in step S407 to the user by using the display device 108 enables the user to recognize an approximate effect of the image processing with the application amount by the server 200. Further, the display device 108 of the imaging apparatus 100 normally displays the image based on the image data reduced so as to fit in a size of the monitor. As a result, in a state of being displayed on the display device 108, appearance of the image based on the image data generated by combination, and appearance of the image based on the image data subjected to the image processing by the server 200 are substantially coincident with each other.

In step S409, the CPU 101 determines whether an instruction to store the image data corresponding to the image displayed on the display device 108 has been issued by the user. In a case where the instruction has been issued (Yes in step S409), the processing proceeds to step S412. In a case where the instruction has not been issued (NO in step S409), the processing proceeds to step S410. For example, in a case where the user touches an icon instructing recording, displayed on the display device 108, the CPU 101 determines that the instruction to store the image data has been issued.

Figure 7:
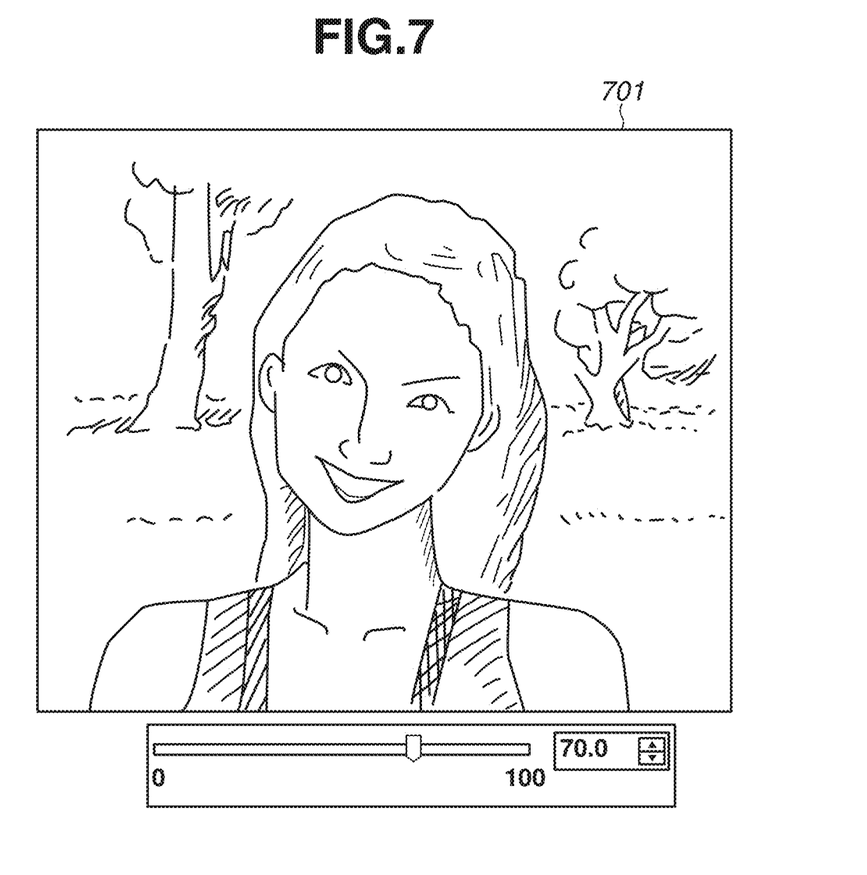
FIG. 7 is a diagram illustrating a state where a display device displays an image and a slider used to adjust a parameter of an application amount of the image processing by the first server.

In step S410, the CPU 101 determines whether an instruction to adjust the application amount of the image processing by the server 200 has been issued by the user through the input I/F 110. In a case where the instruction has been issued (YES in step S410), the processing proceeds to step S411. In a case where the instruction has not been issued (NO in step S410), the processing returns to step S409. FIG. 7 illustrates an example of a user interface to adjust the application amount of the image processing by the server 200. FIG. 7 illustrates a state where the display device 108 displays the image based on the image data generated in step S407 and a slider to adjust the parameter of the application amount of the image processing by the server 200. The display device 208 is a touch panel. The user can adjust the parameter of the application amount by moving the slider displayed below the image. Alternatively, the user can adjust the parameter of the application amount by touching an area indicating the application amount on a right side of the slider and then operating a cross key (not illustrated).

In step S411, the CPU 101 sets the combination ratio in step S407 again based on the parameter of the application amount adjusted by the user. The processing then returns to step S407.

In step S407, the CPU 101 causes the image processing circuit 111 to again combine the image data acquired by the imaging apparatus 100 in step S401 or the image data subjected to the image processing in step S405 with the high-quality image data received in step S406 at the newly set combination ratio. In step S408, the CPU 101 displays the image on the display device 108 by using the image data generated in step S407. This enables the user to recognize an approximate effect of the image processing with the application amount by the server 200.

In this example, before the processing proceeds to step S407, the imaging apparatus 100 receives, from the server 200, the high-quality image data subjected to the image processing with the maximum value of the application amount. Thus, the imaging apparatus 100 can generate image data similar to the image data subjected to the image processing with any application amount within the entire range from 0% to 100% by the server 200, only by changing the combination ratio. Thus, it is sufficient to perform the image processing by the server 200 and the processing to transmit the image data from the server 200 to the imaging apparatus 100, once.

In step S409, in the case where the instruction to store the image data corresponding to the image displayed on the display device 108 has been issued by the user (YES in step S409), the processing proceeds to step S412. It is determined from the user instruction to store the image that the adjustment of the application amount by the user has been completed. In step S412, it is determined whether the application amount has been changed from the initial value (100%) in step S411. In a case where the application amount has been changed from the initial value (YES in step S412), the processing proceeds to step S413. In a case where the application amount has not been changed from the initial value (NO in step S412), the processing skips step S413 and proceeds to step S414.

In step S413, the CPU 101 transmits the application amount of the image processing by the server 200 corresponding to the combination ratio set in step S411, to the server 200 using the communication circuit 107.

In step S414, the CPU 101 wait until the CPU 101 receives the image data generated by performing the image processing with the application amount transmitted in step S413 by the server 200, from the server 200 (NO in step S414). When the CPU 101 receives the image data (YES in step S414), the processing proceeds to step S415.

In step S415, the CPU 101 stores, in the storage medium 109, the image data generated by performing the image processing with the application amount transmitted in step S413, received from the server 200. At this time, the CPU 101 may display the image based on the image data on the display device 108. Then, the processing in the flowchart ends.

Referring back to FIG. 4, in step S402, in the case where the imaging apparatus 100 has not been set to use the image processing by the server 200 (NO in step S402), the processing proceeds to step S416.

In step S416, the CPU 101 determines whether the image processing inside the imaging apparatus 100 is necessary for the image data. In a case where the image processing is necessary (YES in step S416), the processing proceeds to step S417. In step S417, the CPU 101 causes the image processing circuit 111 to perform image processing similar to the image processing in step S405, on the image data. The processing then proceeds to step S415 in FIG. 5. In a case where it is determined in step S416 that the image processing is unnecessary (NO in step S416), the processing skips step S417 and proceeds to step S415, and the image data is stored in the storage medium 109.

Figure 6:
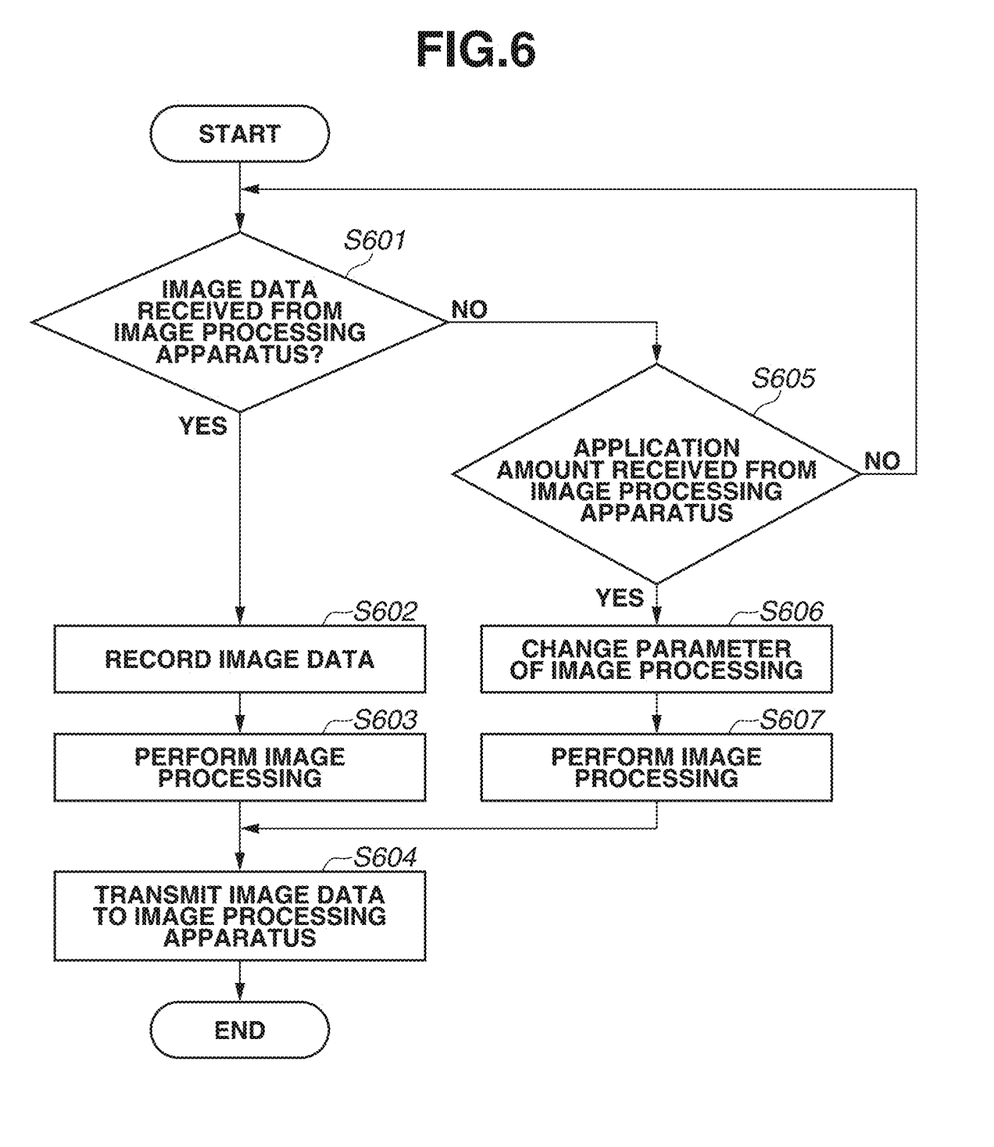
FIG. 6 is a flowchart illustrating processing by the first server.

FIG. 6 is a flowchart illustrating processing performed by the server 200.

In step S601, the CPU 201 determines whether the image data has been received from the imaging apparatus 100 through the communication circuit 205. This processing corresponds to the processing by the imaging apparatus 100 in step S403 in FIG. 4. In a case where the image data has been received from the imaging apparatus 100 (YES in step S601), the processing proceeds to step S602. In a case where the image data has not been received (NO in step S601), the processing proceeds to step S605.

In step S602, the CPU 201 stores the image data received through the communication circuit 205, in the storage medium 206.

In step S603, the CPU 201 causes the image processing circuit 204 to perform image processing including the high-performance processing not performable by the imaging apparatus 100, on the image data received through the communication circuit 205, thereby generating the high-quality image data. Then, the processing proceeds to step S604. Examples of the image processing performed in step S603 include the noise reduction processing using the deep learning in the machine learning, the high resolution processing, and the optical aberration correction processing, as described above. Further, the application level of the image processing applied by the server 200 can be changed based on the application amount of which image processing being adjustable. In step S603, however, the CPU 201 causes the image processing circuit 204 to perform the image processing with the application amount set to the maximum value, i.e., the application level set to the maximum level, on the received image data.

In step S605, the CPU 201 determines whether the application amount of the image processing by the server 200 has been received from the imaging apparatus 100 through the communication circuit 205. This processing corresponds to the processing by the imaging apparatus 100 in step S413 of FIG. 5. In a case where the adjusted application amount has been received from the imaging apparatus 100 (YES in step S605), the processing proceeds to step S606. In a case where the adjusted application mount has not been received from the imaging apparatus 100 (NO in step S605), the processing returns to step S601.

In step S606, the CPU 201 changes a parameter for the image processing by the image processing circuit 204 based on the received application amount. In a case where the image processing is complicated, the parameter for each application amount is desirably prepared in advance because relationship between the application amount and a magnitude of the parameter of the image processing becomes nonlinear.

In step S607, the CPU 201 causes the image processing circuit 204 to perform the image processing using the parameter set in step S606, on the image data stored in step S602, thereby generating high-quality image data corresponding to the received application amount. Then, the processing proceeds to step S604.

In step S604, the CPU 201 transmits the high-quality image data generated in step S603 or the high-quality image data generated in step S607, to the imaging apparatus 100 through the communication circuit 205. At this time, the server 200 may not only transmit the generated high-quality image data to the imaging apparatus 100 but also store the generated high-quality image data in the storage medium 206 of the server 200 to allow the user to access the stored high-quality image data at an arbitrary timing later.

In step S604, the CPU 201 transmits the high-quality image data generated in step S603 or the high-quality image data generated in step S607, to the imaging apparatus 100 through the communication circuit 205. At this time, the server 200 may store the generated high-quality image data in the storage medium 206 of the server 200 without transmitting the generated high-quality image data to the imaging apparatus 100, to allow the user to access the stored high-quality image data at an arbitrary timing later.

As described above, the imaging apparatus 100 according to the present exemplary embodiment combines the high-quality image data generated through the image processing by the server 200 and the image data not subjected to the image processing by the server 200, based on the application amount of the image processing by the server 200. In a case where the application amount of the image processing by the server 200 is changed, the imaging apparatus 100 changes the combination ratio of the image data based on the changed application amount. With this operation, the imaging apparatus 100 can internally generate the image data similar to the image data generated through the image processing with the appropriate application amount by the server 200. Therefore, even when the application amount of the image processing by the server 200 is changed a plurality of times, it is unnecessary for the server 200 to generate new image data a plurality of times, and it is unnecessary to exchange the image data between the imaging apparatus 100 and the server 200 a plurality of times. As described above, according to the present exemplary embodiment, it is possible to provide the image processing apparatus that can easily adjust the application amount of the image processing by the external apparatus without increasing traffic.

Further, in a case where the application amount of the image processing by the server 200 is determined, the server 200 performs the image processing based on the application amount to generate the high-quality image data again. This enables the user to obtain the high-quality image data at the desired effect level.

Figure 4:
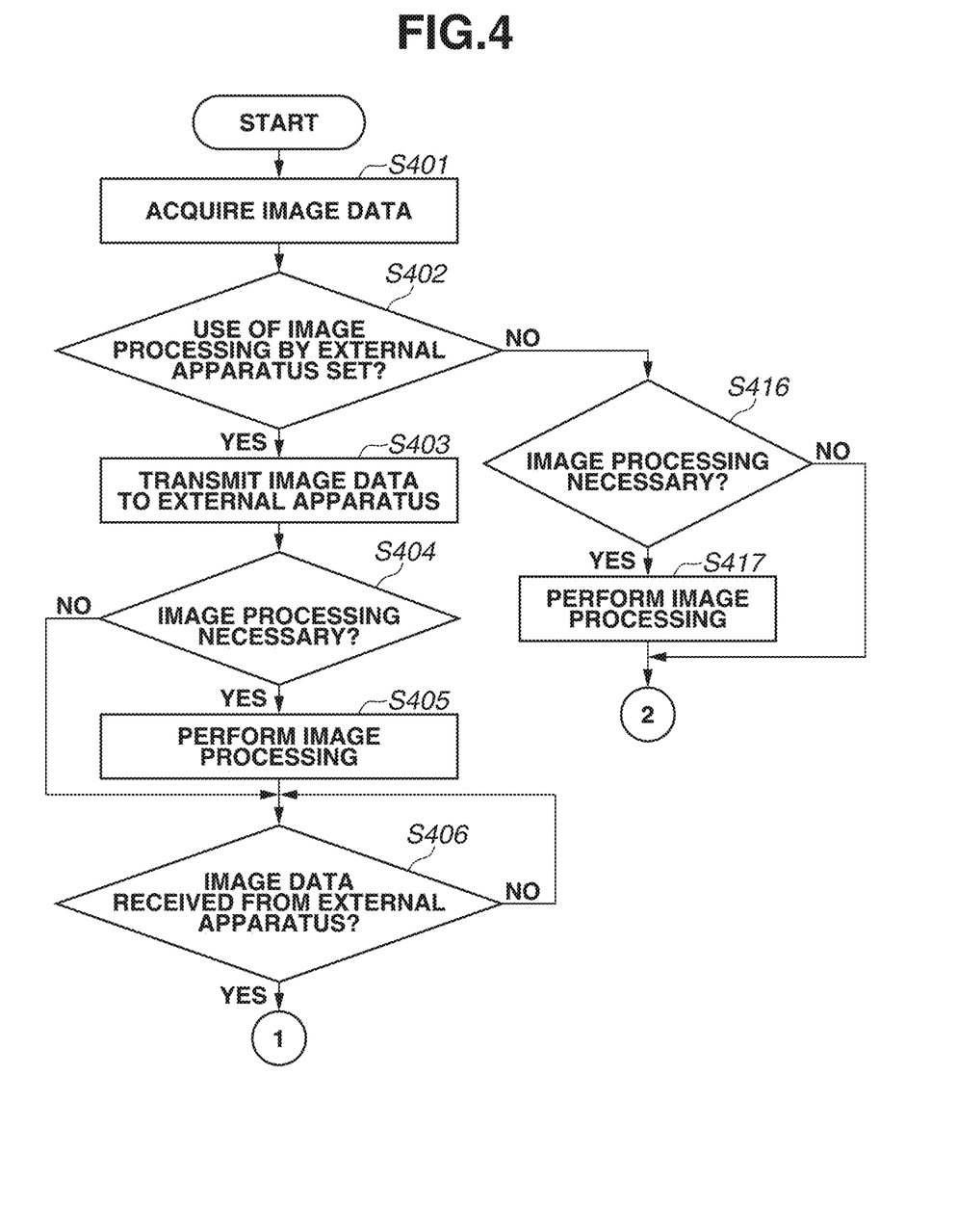
FIG. 4 is a flowchart illustrating processing performed by the imaging apparatus in a case where the image processing is performed by the first server.
Figure 5:
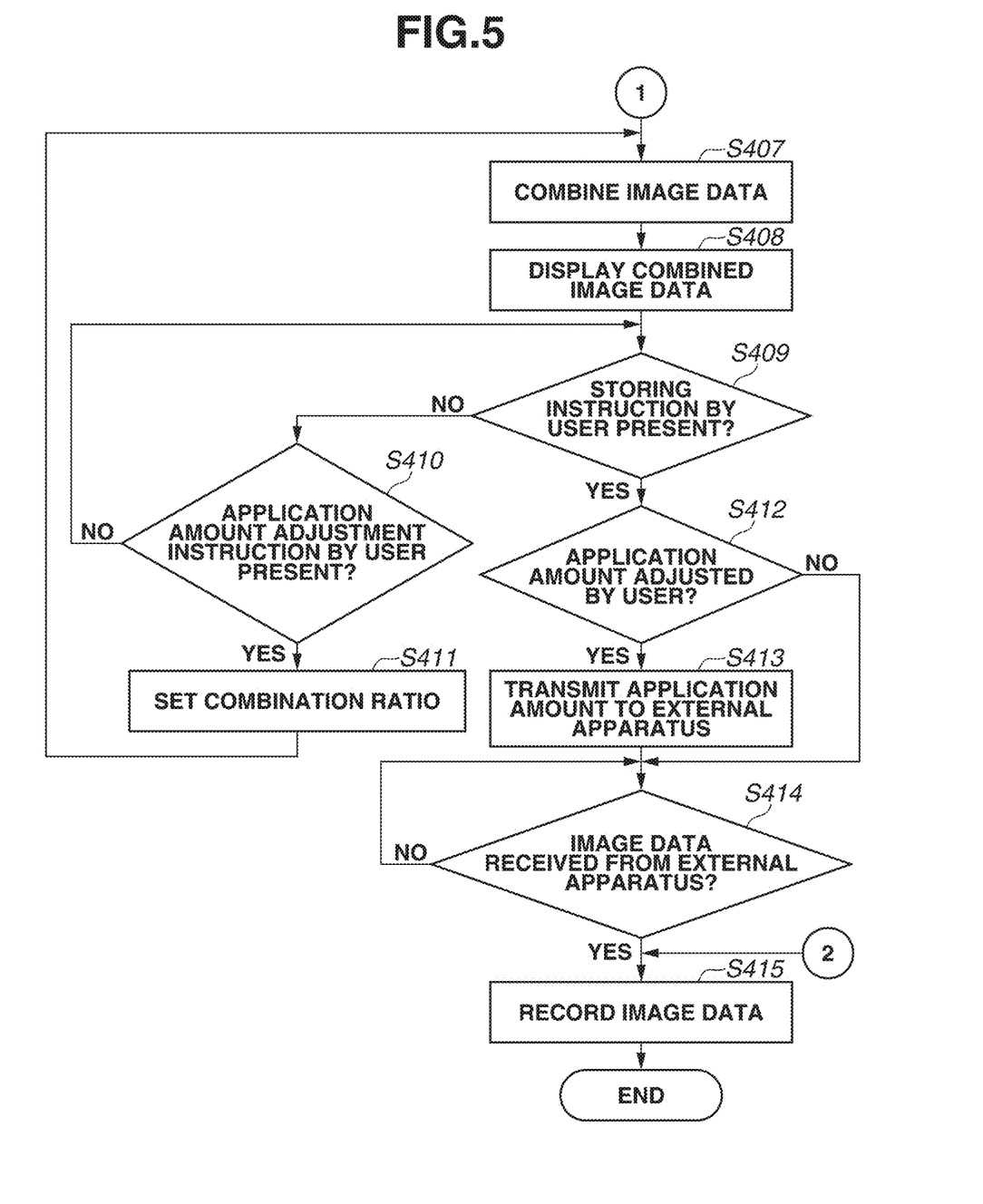
FIG. 5 is a flowchart illustrating the processing by the imaging apparatus in the case where the image processing is performed by the first server.
Figure 8:
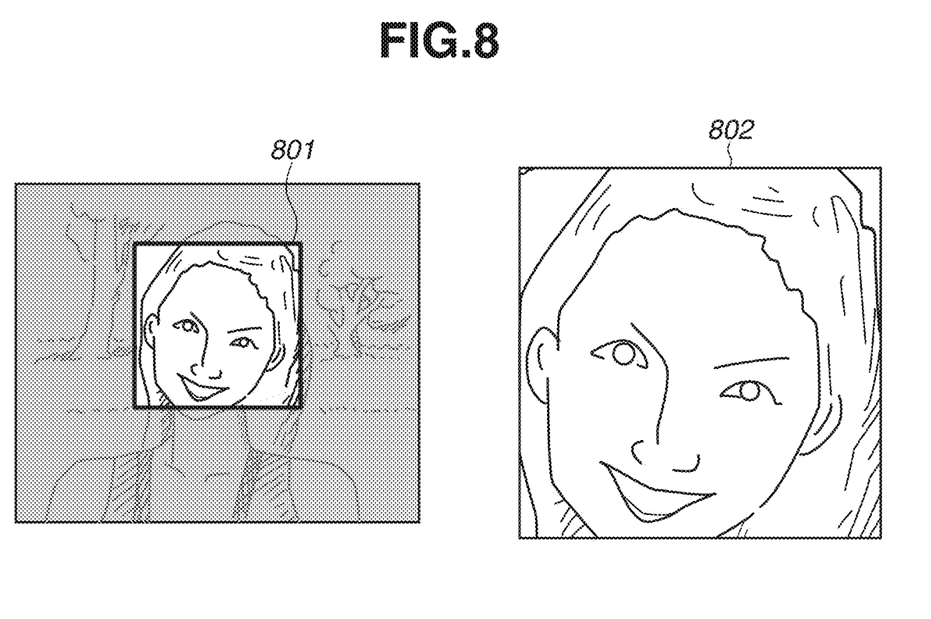
FIG. 8 is a diagram illustrating a partial area of image data transmitted from the imaging apparatus to the first server.

In addition, in step S403 of FIG. 4, the imaging apparatus 100 may transmit only a part of the image data to the server 200, and the server 200 may perform the image processing on only the part of the image data. FIG. 8 illustrates a partial area of the image data transmitted from the imaging apparatus 100 to the server 200. In a case where the processing is performed for the user to check the effect of the image processing with the set application amount by the server 200, it is unnecessary to present the whole of the image data to the user, and only a center area of the image data or only an attention area in focusing may be presented to the user. The imaging apparatus 100 transmits only image data 802 corresponding to a partial area 801 of the image data, to the server 200. The server 200 performs the image processing using the parameter corresponding to the maximum value of the application amount, on the received image data 802, to generate high-quality image data corresponding to the partial area 801. The imaging apparatus 100 combines the high-quality image data corresponding to the partial area and the image data 802 not subjected to the image processing by the server 200, and presents the combined image data to the user. In a case where the user further adjusts the application amount, the imaging apparatus 100 combines the high-quality image data corresponding to the partial area and the image data 802 not subjected to the image processing by the server 200 at the combination ratio corresponding to the application amount, and presents the combined image to the user.

In a case where an instruction to store the image data is issued by the user, the imaging apparatus 100 transmits the whole of the image data including the partial area 801 together with the adjusted application amount, to the server 200. Thereafter, the server 200 performs the image processing using the parameter corresponding to the transmitted application amount, on the whole of the image data, and transmits the generated high-quality image data to the imaging apparatus 100. This makes it possible to reduce the traffic between the imaging apparatus 100 and the server 200 and the processing load on the server 200 before the instruction to store the image data is issued by the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-022218, filed Feb. 13, 2020, which is hereby incorporated by reference herein in its entirety.

What is claimed is:

1. L An image processing apparatus, comprising:
one or more processors that execute a program stored in a memory to function as:
a communication unit configured to transmit first image data to an external apparatus and to receive, from the external apparatus, second image data generated by the external apparatus performing first image processing on the first image data;
an image processing unit configured to process the second image data;
a control unit configured to set a level of the processing by the image processing unit; and
a user interface configured to adjust a level of the first image processing by the external apparatus,
wherein the control unit causes the image processing unit, when the level of the first image processing is adjusted through the user interface, to process the second image data at a level corresponding to the adjusted level of the first image processing.

2. The image processing apparatus according to claim 1, wherein the control unit displays an image based on image data generated by the image processing unit processing the second image data, on a display unit.

3. The image processing apparatus according to claim 1, wherein the control unit causes the communication unit, in a case where an instruction corresponding to completion of the adjustment of the level of the first image processing is issued through the user interface, to transmit to the external apparatus data representing the level of the first image processing.

4. The image processing apparatus according to claim 3, wherein the image processing unit causes the image processing unit to reprocess the second image data at the level corresponding to the adjusted level of the first image processing in response to adjustment of the level of the first image processing through the user interface until the instruction corresponding to completion of the adjustment of the level of the first image processing is issued.

5. The image processing apparatus according to claim 3, wherein the communication unit receives fourth image data generated by the external apparatus performing the first image processing of a level corresponding to the data representing the level of the first image processing received from the communication unit.

6. The image processing apparatus according to claim 5, wherein the fourth image data is generated by the external apparatus performing the first image processing of the level corresponding to the data representing the level of the first image processing, on the first image data.

7. The image processing apparatus according to claim 5, wherein the fourth image data is generated by the external apparatus performing the first image processing of the level corresponding to the data representing the level of the first image processing, on image data including the first image data.

8. The image processing apparatus according to claim 1, wherein the second image data is generated by the external apparatus performing the first image processing of the level corresponding to a maximum value of the level of the first image processing, on the first image data.

9. The image processing apparatus according to claim 1, wherein the image processing unit processes the second image data by combining the second image data and third image data not subjected to the first image processing at a combination ratio corresponding to the level of the first image processing.

10. The image processing apparatus according to claim 9, wherein the third image data is generated by the image processing unit performing second image processing on the first image data, and
wherein the first image processing is higher than the second image processing in load.

11. The image processing apparatus according to claim 9, wherein the third image data is the image data as the first image data.

12. The image processing apparatus according to claim 1, wherein the first image processing is image processing using deep learning in machine learning.

13. The image processing apparatus according to claim 1, wherein the first image processing is at least any of noise reduction processing, high resolution processing, and optical aberration correction processing.

14. The image processing apparatus according to claim 1, wherein the external apparatus is a server.

15. An image processing system, comprising:
an external apparatus; and
an image processing apparatus,
wherein the external apparatus includes one or more processors that execute a program stored in a memory to function as:
a first communication unit configured to communicate with the image processing apparatus; and
a first image processing unit configured to perform first image processing on image data,
wherein the image processing apparatus includes one or more processors that execute a program stored in a memory to function as:
a second communication unit configured to communicate with the external apparatus;
a second image processing unit configured to process image data;
a control unit configured to set a level of the processing by the second image processing unit; and
a user interface configured to adjust a level of the first image processing by the external apparatus,
wherein the second communication unit of the image processing apparatus transmits first image data to the external apparatus,
wherein the first image processing unit of the external apparatus generates the second image data by performing the first image processing on the first image data received through the first communication unit,
wherein the first communication unit of the external apparatus transmits the second image data to the image processing apparatus, and
wherein the control unit of the image processing apparatus causes the second image processing unit, when the level of the first image processing is adjusted through the user interface, to process the second image data at a level corresponding to the adjusted level of the first image processing; and displays on a display unit an image based on the image data generated by processing the second image data.

16. A method of controlling an image processing apparatus, the method comprising:
transmitting first image data to an external apparatus;
receiving, from the external apparatus, second image data generated by performing first image processing on the first image data;
processing the second image data; and
reprocessing the second image data, when a level of the first image processing by the external apparatus is adjusted through a user interface, at a level corresponding to the adjusted level of the first image processing.

17. A method of controlling an image processing system that includes an image processing apparatus and an external apparatus communicable with each other, the method comprising:
   causing the image processing apparatus to transmit first image data to the external apparatus;
   causing the external apparatus generate second image data by performing first image processing on the first image data received from the image processing apparatus;
   causing the external apparatus to transmit the second image data to the image processing apparatus;
   causing the image processing apparatus to process the second image data;
   causing the image processing apparatus to receive an instruction to adjust a level of the first image processing by the external apparatus through a user interface;
   causing the image processing apparatus to reprocess the second image data, in response to the instruction to adjust the level of the first image processing, at a level corresponding to the adjusted level of the first image processing; and
   causing a display unit to display an image based on the image data generated by processing the second image data.

18. A non-transitory computer-readable medium that stores a program causing a computer to function as an image processing apparatus, the image processing apparatus comprising:
   a communication unit configured to transmit first image data to an external apparatus and to receive, from the external apparatus, second image data generated by performing first image processing on the first image data;
   an image processing unit configured to process the second image data;
   a control unit configured to set a level of the processing by the image processing unit;
   a user interface configured to adjust a level of the first image processing by the external apparatus,
   wherein the control unit causes the image processing unit, when the level of the first image processing is adjusted through the user interface, to process the second image data at a level corresponding to the adjusted level of the first image processing.

* * * * *